United States Patent [19]

Herczeg et al.

[11] Patent Number: 5,671,003

[45] Date of Patent: Sep. 23, 1997

[54] HYBRID DIGITAL IMAGE PRINTER WITH HALFTONE GRAY SCALE CAPABILITY

[75] Inventors: Karen L. Herczeg; David M. McVay, both of Rochester, N.Y.

[73] Assignee: Eastman Kodak Company, Rochester, N.Y.

[21] Appl. No.: 787,284

[22] Filed: Nov. 4, 1991

[51] Int. Cl.$^6$ ............................................... H04N 1/21
[52] U.S. Cl. ................................... 347/251; 358/298
[58] Field of Search ................................ 346/108, 76 L, 346/107 K, 160, 1.1; 358/298, 296, 300, 302

[56] References Cited

U.S. PATENT DOCUMENTS

| | | |
|---|---|---|
| 4,661,861 | 4/1987 | Rutherford et al. ............... 358/302 |
| 4,679,057 | 7/1987 | Hamada ........................... 346/76 L |
| 4,754,291 | 6/1988 | Horikawa .......................... 346/108 |
| 4,965,672 | 10/1990 | Duke et al. ...................... 358/298 |

*Primary Examiner*—Mark J. Reinhart
*Attorney, Agent, or Firm*—Norman Rushefsky

[57] ABSTRACT

A gray scale printer is adapted to modulate an exposure source in both amplitude and duration in accordance with an eight-bit data signal. The printer provides for modulating the amplitude of the exposure source in accordance with the six least significant bits of the data signal, and for modulating the duration of the exposure source in accordance with the two most significant bits of the data signal. Amplitude modulation may effect electrical current to the exposure source, and the duration modulation may effect pulse width of electrical current to the exposure source. The exposure source may be, for example, a laser diode or a light-emitting diode array.

10 Claims, 3 Drawing Sheets

HYBRID DIGITAL IMAGE PRINTER WITH HALFTONE GRAY SCALE CAPABILITY

BACKGROUND OF THE INVENTION

1. Technical Field

This invention relates generally to gray scale printers, and more particularly to a printer in which gray scale is reproduced by modulating an exposure source in both amplitude and duration.

2. Background Art

In digital recording apparatus, a record medium is rasterwise exposed with a point light source or sources, such as a scanning laser beam or an array of light-emitting diodes, to form visual or latent images on the record medium. The record medium may, for example, be a photoconductive member on which an electrostatic image is formed by selective exposure to light. The electrostatic image is developable by, say, the electrographic process.

Tone scale image quality depends on both the system tone reproduction curve, which defines a gray scale transformation from the digital image data to the printed image, and on the number of levels of gray the system is capable of reproducing. Halftone imagery is an approximation by the printing apparatus to produce the continuum of gray scale by varying the exposure intensity and/or the printed dot sizes prearranged in a geometric pattern. Variations yield a varying percent of light reflection from the printed image thereby creating the apparent gray scale illusion.

Various proposals have been made for reproducing tones with the use of such apparatus, including modulating the exposure duration and/or exposure amplitude of the light source. See for example U.S. Pat. No. 4,679,057, which issued to A. Hamada on Jul. 7, 1987.

Pulse width modulation is illustrated in FIG. 1. The current supplied to an exposure source, such as light-emitting diodes or a laser diode, is constant. Gray scale is effected by modulating the "on" time of the light source. Pulse width modulation is used in most commercially available black-only gray scale printers, wherein different pulse widths are required for the different gray levels.

To generate the necessary pulses, high clock rates and wide bandwidth components are required. In an example which will be used throughout this specification, to produce ten images a minute at 300 dots per inch, the process must operate at 2.5 inches per second. This process speed and resolution correspond to a line time of 1.33 msec. With a laser scan efficiency of 60%, the active scan line time is 800 msec. If an active scan line has 2667 pixels, the pixel time is 300 nsec. To do full pulse width modulation of eight bits per pixel at the 300 nsec/pixel rate would require components with bandwidths of 850 MHz (255-levels/300 nsec).

Exposure amplitude modulation is illustrated in FIG. 2. In this case, the "on" time of the light source is constant. The modulation is done by changing the current supplied to the light-emitting diodes or to the laser diode. Amplitude modulation is used in very high resolution, continuous tone applications. The current is usually modulated through a digital-to-analog converter. Ten and twelve bit, high speed, high linearity digital-to-analog converters are commonly used.

Amplitude modulation alone uses the entire pixel time which in some cases may be longer than the thermal time constant associated with the self-heating of the diode. This will have the undesirable effect of shifting the laser threshold and forward current characteristic of the diode. Thermal control (i.e. thermoelectric coolers) are a typical costly solution to the heating associated with current modulated laser diodes.

Light-emitting diodes and laser diodes can be controlled through combined pulse width and amplitude modulation, herein referred to as hybrid modulation. Hybrid modulation is illustrated in FIG. 3.

Hybrid modulation reduces the component and system bandwidths to fractions of the comparable resolution pulse width modulation systems. In the specific case outlined, hybrid modulation would result in 13.36 MHz (4/300 nsec) for the hybrid versus 850 MHz for the pure pulse width case. This is a 63 fold reduction in bandwidth. The bandwidth is a very important consideration in the cost of the modulator.

Further, the Hybrid techniques can be used to reduce this thermal shifting of the forward diode characteristic due to self heating of the diode. Since the pulse width may be varied as well as the current level, the thermal time constant may never have to be exceeded. An optimal current level-pulse width combination may be found to minimize this effect.

DISCLOSURE OF INVENTION

It is an object of the present invention to use a hybrid modulation approach which accents the more favorable characteristics of pulse width and amplitude modulation while minimizing the unfavorable aspects of each method. This approach allows use of relatively low bandwidth components, leading to cheaper components and an overall reduction in power requirements in the system.

According to one aspect of the present invention, a gray scale printer is adapted to modulate an exposure source in both amplitude and duration in accordance with an eight-bit data signal. The printer provides for modulating the amplitude of the exposure source in accordance with six bits of the data signal, and for modulating the duration of the exposure source in accordance with two bits of the data signal.

According to another aspect of the present invention, a gray scale printer is adapted to modulate an exposure source in both amplitude and duration in accordance with a multi-bit data signal. The printer provides for modulating the amplitude of the exposure source in accordance with the less significant bits of the data signal, and for modulating the duration of the exposure source in accordance with the more significant bits of the data signal.

According to still another aspect of the present invention, a gray scale printer is adapted to modulate an exposure source in both amplitude and duration in accordance with an eight-bit data signal. The printer provides for modulating the amplitude of the exposure source in accordance with the six least significant bits of the data signal, and for modulating the duration of the exposure source in accordance with the two most significant bits of the data signal.

In a preferred embodiment of the present invention, the amplitude modulation may effect electrical current to the exposure source, and the duration modulation may effect pulse width of electrical current to the exposure source. The exposure source may be, for example, a laser diode or a light-emitting diode array.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

Hybrid modulation can be implemented using as many combinations of pulse widths and amplitude levels as the system will support. For example, eight bits of modulation data will support the following divisions:

| TOTAL BITS | PMW BITS | PMW LEVELS | CM BITS | CM LEVELS |
|---|---|---|---|---|
| 8 | 1 | 2 | 7 | 128 |
| 8 | 2 | 4 | 6 | 64 |
| 8 | 3 | 8 | 5 | 32 |
| 8 | 4 | 16 | 4 | 16 |
| 8 | 5 | 32 | 3 | 8 |
| 8 | 6 | 64 | 2 | 4 |
| 8 | 7 | 128 | 1 | 2 |

According to one feature of the present invention, hybrid modulation is implemented in an eight-bit system using two bits for pulse width modulation and six bits for amplitude modulation. We have found that this particular arrangement results in the maintenance of the lowest bandwidth for the system.

For example, the required system bandwidth for the illustrative example used throughout this specification is 26.6 MHz, or eight times the pixel rate of 3.33 MHz. This number is reached based on an arbitrary acceptable error in the pixel placement of 1/8 the dimension of the pixel in the crosstrack direction. Going, say, as slow as four times the pixel rate would result in visible pixel placement error; while going, say, as fast as sixteen times the pixel rate would dramatically increase component cost.

Selecting to use two bits for pulse width modulation and six bits for amplitude modulation, permits the selection of low cost components worked at their fastest speed. If, on the otherhand, three bits were used for pulse width modulation, the clock speed would double, requiring faster, more expensive components. Going to one bit for pulse width modulation and seven bits for amplitude modulation would reduce the speed by a factor of two, but would also drop the control of the laser below the noise floor of the system; creating an unacceptable signal-to-noise ratio and result in the loss of usable information.

Figure 1:
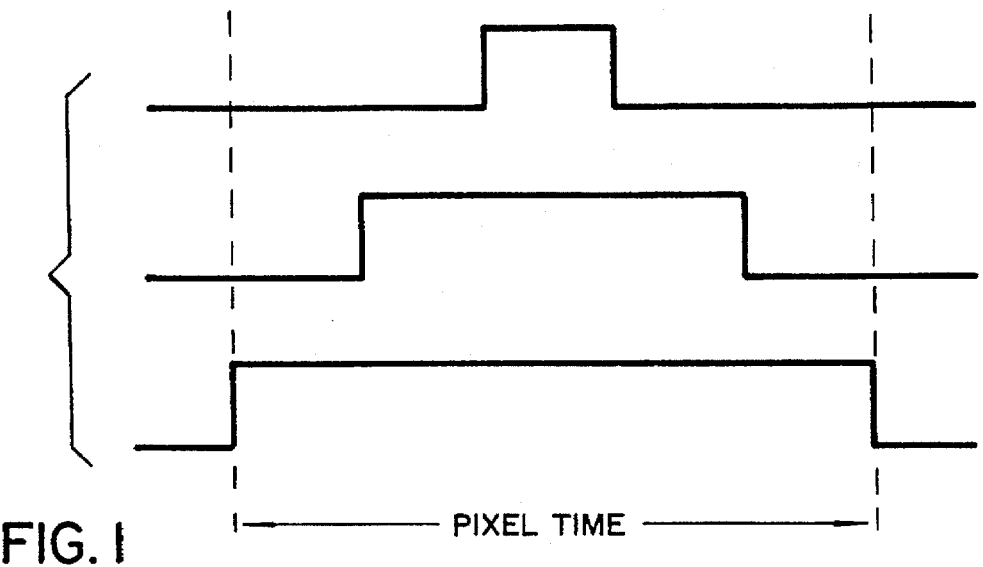
FIG. 1 is an illustration of the pixel time for various gray scales using pulse width modulation.
Figure 2:
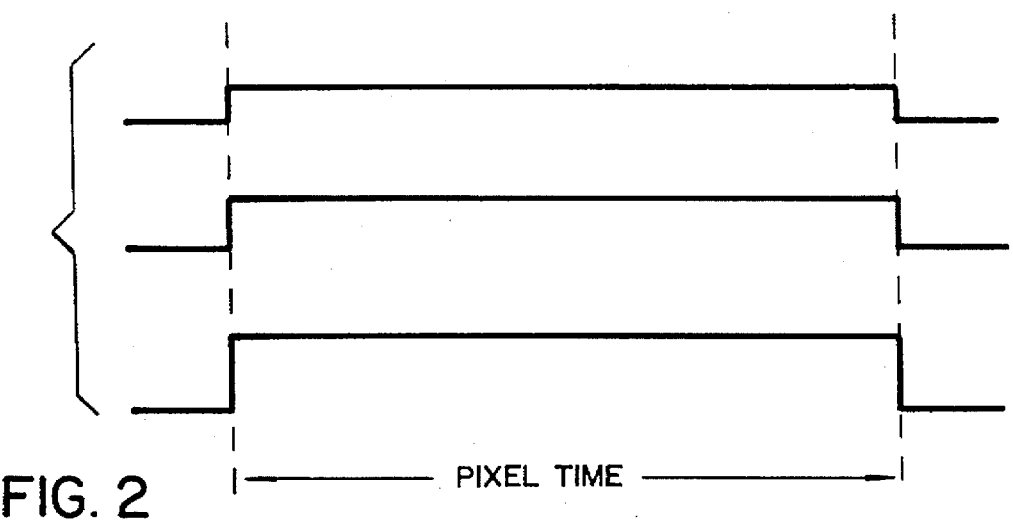
FIG. 2 is an illustration of the pixel illumination for various gray scales using amplitude modulation.
Figure 3:
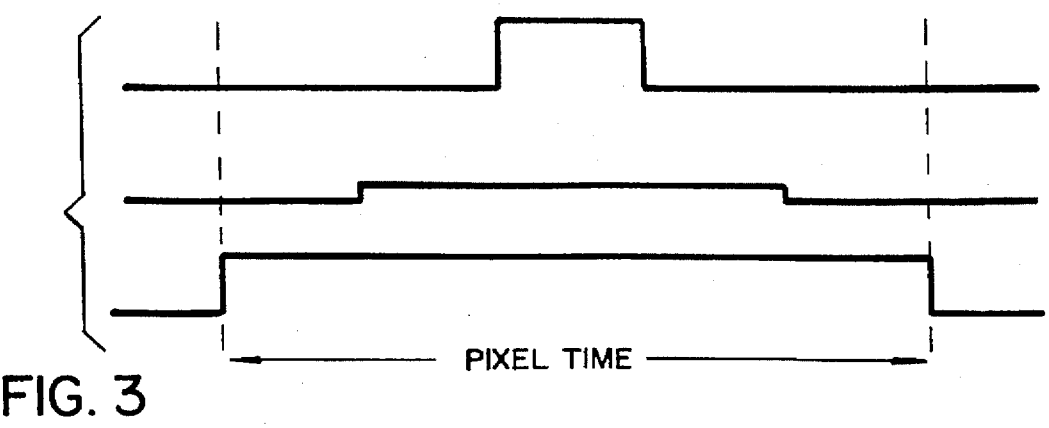
FIG. 3 is an illustration of the pixel time and pixel illumination for various gray scales using hybrid modulation.
Figure 4:
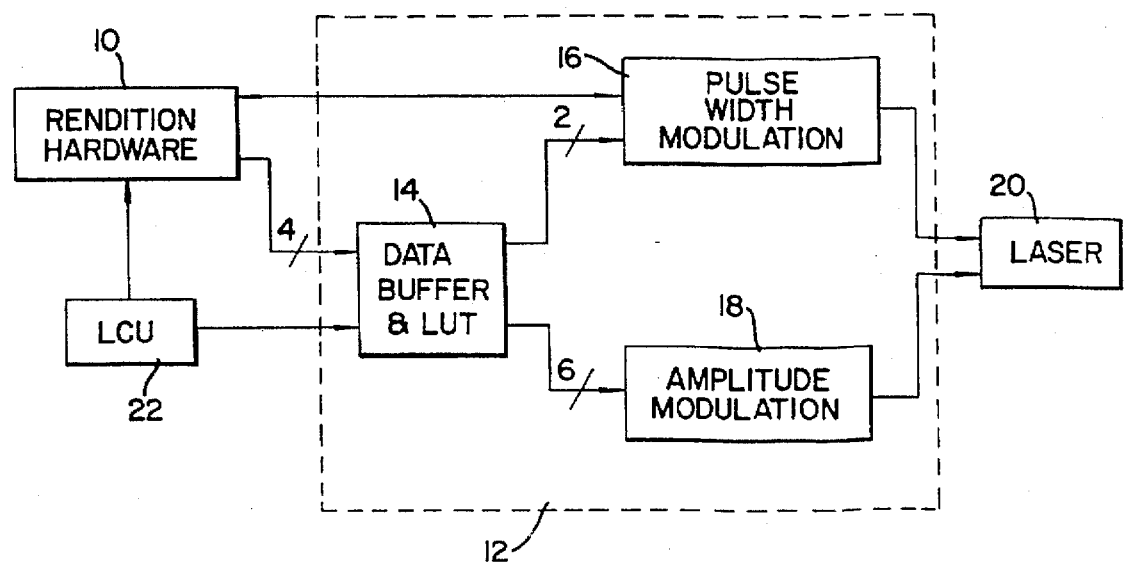
FIG. 4 is a schematic block diagram of a gray scale printer in accordance with a preferred embodiment of the present invention.

A block diagram of the hybrid modulator designed for the printer is shown in FIG. 4. This diagram shows rendition hardware 10 input to a laser modulator 12. Major components of the laser modulator includes a data buffer and look-up table 14, a pulse width modulation block 16, and an amplitude modulation block 18. Each of these major components will be discussed in further detail below. A laser block 20 on the right-hand side of FIG. 4 includes a laser diode and a driver integrated circuit, as is well known in the art.

The rendition hardware provides the pixel exposure data to laser modulator 12. This data is a four-bit value (zero to fifteen) received either in bytes (2 pixels) from a full framestore or in nibbles (1 pixel) from a compressed page buffer. The pixel data is not stored or pipelined as it is received by the modulator. That is, modulation is real time.

The timing for the pixel data is generated within modulator 12. For the example used in this specification, the pixel clock is 300 nsec in duration and is synchronized within an eighth of a pixel to the start of line input from the laser scanner. The half pixel clock frequency (600 nsec in duration, also synchronized to the start of line) is sent to the full framestore to clock out data as bytes.

A logic and control unit 22 provides signal conditioning of machine timing signals for amplitude modulator 18 and rendition hardware 10. The signals from the logic and control unit are a start of page (SOP) signal and an "engine up to speed" (Rdy) signal. The start of page signals are counted and used to generate color separation count signals, $S_0$ and $S_1$ to be used by data buffer and look-up table 14 to select separation-dependent look-up tables used for color correction.

Figure 5:
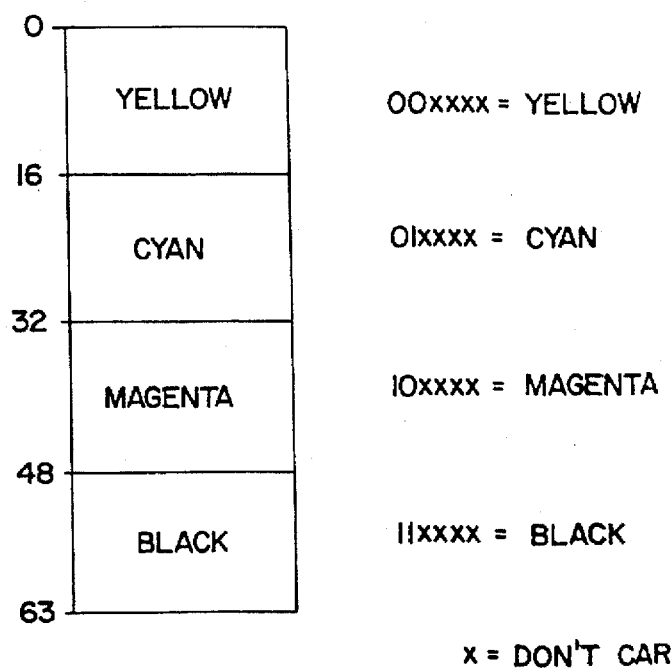
FIG. 5 is a diagram of the organization of a table look-up according to a feature of the present invention.

A separate look-up table is required for each color separation as depicted in FIG. 5. The individual color toners may not have the same tone reproduction characteristics, and different amounts of each toner would therefore be required to obtain a given density.

The two-bit color separation count signals $S_0$ and $S_1$ and the four-bit pixel data signals are used as a six-bit index into the sixty-four table locations. The table entry size is eight bits wide, and represents the exposure data signal which is split into the six bits of amplitude modulation and the two bits of pulse width modulation data. The table of FIG. 5 is organized such that color separations occupy contiguous blocks of memory. Therefore, the two separation bits $S_0$ and $S_1$ are the more significant.

The choice of two most significant bits for pulse width modulation and six less significant bits for amplitude modulation is illustrated below:

| DATA VALUE (DECIMAL) | HEX | PULSE WIDTH % OF PIXEL |
|---|---|---|
| 0–63 | 00xxxxxx | 25 |
| 64–127 | 01xxxxxx | 37.5 |
| 128–191 | 10xxxxxx | 50 |
| 192–255 | 11xxxxxx | 75 |

Figure 6A:
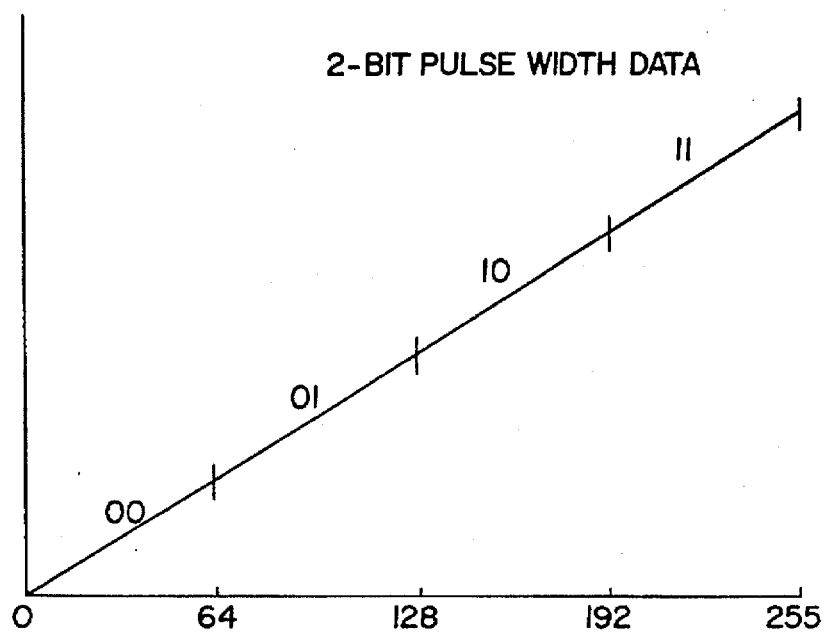
FIGS. 6A and 6B are graphs of exposure values according to different levels of image data.
Figure 6B:
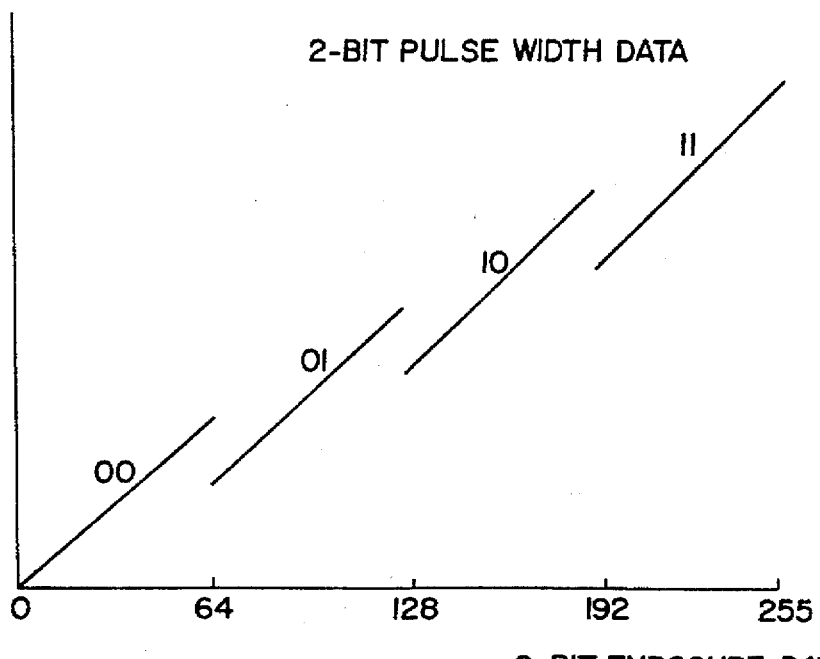

The entries in the table are determinable both empirically and experimentally, and represent the fifteen best exposure levels (with respect to equal lightness) chosen from the available 255 levels for each color separation. With this organization, within a given pulse width (e.g., 25%), the numerically higher data value will correspond to a greater exposure level. That is, 25 has more exposure, or more light, than 20. Further, this organization is such that the exposure is greater as the pulse width increases, as shown in the ideal case of FIG. 6A. However, based on the pulse width selection, the exposure level at the top of one range may exceed the exposure level at the bottom of the next higher range, as illustrated in a more real case of FIG. 6B.

The eight-bit exposure value from the look-up table is divided into a two-bit data signal to do pulse width modulation and a six-bit data signal to do amplitude modulation. The six less significant bits of the exposure value are used in the amplitude modulation section of the driver. The two most significant bits of the exposure value are used to designate the pixel's pulse width. Four arbitrary choices of pulse widths might for example be 225 nsec, 150 nsec, 112.5 nsec and 75 nsec. These correspond to 75%, 50%, 37.5% and 25% of a pixel time in the illustrative example. A 26.7 Mhz clock is used to generate the pulse widths. 26.7 Mhz is eight times the pixel clock frequency. The pixel clock and half pixel clock frequency are generated from this clock. This assures that the pixel clock and pulse widths are synchronized. The 26.7 Mhz clock is also used to do the start of line synchronization previously discussed.

The Hybrid modulation techniques described offer distinct advantages over pure pulse width modulation and pure current modulation of laser diodes. Hybrid modulation reduces the component and system bandwidths to fractions of the comparable resolution pulse width modulation systems. In the specific case outlined, the reduction is 13.36 MHz (4/300 nsec) for the hybrid versus 850 MHz (255/300 nsec) for the pure pulse width case. This is a 63 fold reduction in bandwidth. The bandwidth is, of course, a very important consideration in the cost of the modulator.

The invention has been described in detail with particular reference to preferred embodiments thereof, but it will be understood that variations and modifications can be effected within the spirit and scope of the invention.

What is claimed is:

1. A gray scale printer adapted to modulate an exposure source in both amplitude and duration in accordance with an eight-bit data signal, said printer comprising:

means for modulating the amplitude of the exposure source in accordance with six bits of the data signal; and means for modulating the duration of the exposure source in accordance with two bits of the data signal:

and wherein the eight-bit data signal represents 256 exposure values (0 to 255) and said means for modulating the duration controls duration so that for exposure values 0 to 63 the duration is about 25% of a nominal pixel recording period, for exposure values 64–127 the duration is about 37% of the nominal pixel recording period, and for exposure values of 128–191 the duration is about 50% of the nominal pixel recording period, and for exposure values of 192–255 the duration is about 75% of the nominal pixel recording period.

2. A gray scale printer as set forth in claim 1 wherein said amplitude modulation means effects electrical current to the exposure source.

3. A gray scale printer as set forth in claim 1 wherein said duration modulation means effects pulse width of electrical current to the exposure source.

4. A gray scale printer as set forth in claim 1 wherein said exposure source is a laser diode.

5. A gray scale printer as set forth in claim 1 wherein said exposure source is a light-emitting diode array.

6. A gray scale printer adapted to modulate an exposure source in both amplitude and duration in accordance with a multi-bit data signal, said printer comprising:

means for modulating the amplitude of the exposure source in accordance with the less significant bits of the data signal; and means for modulating the duration of the exposure source in accordance with the more significant bits of the data signal and wherein the number of more significant bits is less than the number of less significant bits.

7. A gray scale printer adapted to modulate an exposure source in both amplitude and duration in accordance with an eight-bit data signal, said printer comprising:

means for modulating the amplitude of the exposure source in accordance with the six least significant bits of the data signal; and means for modulating the duration of the exposure source in accordance with the two most significant bits of the data signal and wherein the eight-bit data signal represents 256 exposure values (0 to 255) and said means for modulating the duration controls duration so that for exposure values 0 to 63 the duration is about 25% of a nominal pixel recording period, for exposure values 64–127 the duration is about 37% of the nominal pixel recording period, and for exposure values of 128–191 the duration is about 50% of the nominal pixel recording period, and for exposure values of 192–255 the duration is about 75% of the nominal pixel recording period.

8. The printer of claim 11 and wherein the eight-bit data signal represents 256 exposure values (0 to 255) and said means for modulating the duration controls duration so that for exposure values 0 to 63 the duration is about 25% of a nominal pixel recording period, for exposure values 64–127 the duration is about 37% of the nominal pixel recording period, and for exposure values of 128–191 the duration is about 50% of the nominal pixel recording period, and for exposure values of 192–255 the duration is about 75% of the nominal pixel recording period.

9. A gray scale printer adapted to modulate an exposure source in both amplitude and duration in accordance with an eight-bit data signal, said printer comprising:

means for modulating the amplitude of the exposure source in accordance with six bits of the data signal; and means for modulating the duration of the exposure source in accordance with two bits of the data signal;

and wherein said duration modulation means effects pulsewidth of electrical current to the exposure source, and further wherein the eight-bit data signal represents 256 exposure values (0 to 255) and said means for modulating the duration controls duration so that for exposure values 0 to 63 the duration is about 25% of a nominal pixel recording period, for exposure values 64–127 the duration is about 37% of the nominal pixel recording period, and for exposure values of 128–191 the duration is about 50% of the nominal pixel recording period, and for exposure values of 192–255 the duration is about 75% of the nominal pixel recording period.

10. The printer of claim 6 wherein the sum of the number of more significant bits and the number of less significant bits is eight and the multibit data signal is an eight-bit data signal.

* * * * *